United States Patent [19]
Hung et al.

[11] Patent Number: 5,268,960
[45] Date of Patent: Dec. 7, 1993

[54] WRITE PROTECTION DEVICE FOR COMPUTER HARD DISK

[75] Inventors: Chan-Chi Hung, Hsinchu; Sheng-Yuan Lee, Chupei; Yao-Jung Kuo, Hsinchu, all of Taiwan

[73] Assignee: Value Technology, Inc., Taiwan

[21] Appl. No.: 918,420

[22] Filed: Jul. 22, 1992

[51] Int. Cl.[5] .............................. G06F 13/12
[52] U.S. Cl. .......................... 380/4; 380/49; 380/50; 360/60; 360/69
[58] Field of Search ............ 360/60, 69; 380/2, 4, 380/23, 25, 49, 50; 340/825.31, 825.34

[56] References Cited

U.S. PATENT DOCUMENTS

| | | | |
|---|---|---|---|
| 4,734,851 | 3/1988 | Director | 360/60 X |
| 5,012,514 | 4/1991 | Renton | 380/4 |

*Primary Examiner*—Bernarr E. Gregory
*Attorney, Agent, or Firm*—Poms, Smith, Lande & Rose

[57] ABSTRACT

A hard disk protection device comprising a decoding circuit which receives signals from the address and data buses of a personal computer to decode the signals associated with hard disk write actions and generating a signal to suppress the signal of IOW line so as to disable the write function of the hard disk. A switch is provided for a user to disconnect the decoding circuit from the hard disk so as to allow the hard disk to be operated as a conventional hard disk.

15 Claims, 1 Drawing Sheet

WRITE PROTECTION DEVICE FOR COMPUTER HARD DISK

FIELD OF THE INVENTION

The present invention relates generally to a hard disk write protection device and in particular to an electronic circuit for disabling write function of a personal computer hard disk.

BACKGROUND OF THE INVENTION

Personal computers usually have at least a disk drive to serve data storage means. The disk drive used in a personal computer can be classified as floppy disk drive which use a floppy magnetic disks, such as 5¼" disks or 3½ disks, and hard disk drive (also referred to as fixed disk drive).

For floppy disks, a write protection notch is provided on the enclosure thereof. Once the notch is covered by, for example, a section of an adhesive tape, the disk drive is prohibited to write data to the protected disks. There is, however, no similar device for protecting hard disks from being written accidently or undesirably.

Currently, there is commercial software available in the market for protecting the hard disks from being accidently over-written. The disadvantage is that to execute such software, the main memory space of the computer must be occupied by the software and thus reducing the availability of the main memory space. Further, the central processing unit of the computer is also shared by such a software when the software is executed and thus lowering the efficiency of the central processing unit in handling other jobs.

It is therefore desirable to have a hard disk write protection device in the form of hardware so as to prevent undesired write action of the hard disks while maintaining the original availability of the main memory space and the central processing unit to the users of a computer.

OBJECTS OF THE INVENTION

The primary object of the present invention is therefore to provide a hard disk write protection device for protecting the hard disks of personal computers from being inadvertently over-written and thus protect the data stored therein from being unintentionally destroyed.

It is another object of the present invention to provide a hard disk write protection device which is capable to be set between a normal mode, in which the hard disk is operated as a conventional hard disk, and a write protection mode, in which the hard disk write protection device will automatically check data signals transferred in address bus and data buss to initiate the write protection function and thus disabling the write function of the hard disk.

To achieve the above-mentioned object, there is provided a hard disk protection device comprising a decoding circuit which receives signals from the address and data buses of a personal computer to decode the signals associated with hard disk write actions and generating a signal to suppress the signal of IOW line so as to disable the write function the hard disk. A switch is provided for a user to disconnect the decoding circuit from the hard disk so as to allow the hard disk to be operated as a conventional hard disk.

Other objects and advantages of the invention will be apparent from the following description of a preferred embodiment taken in connection with the only one drawing which is:

DETAILED DESCRIPTION OF THE PREFERRED EMBODIMENT

Figure 1:
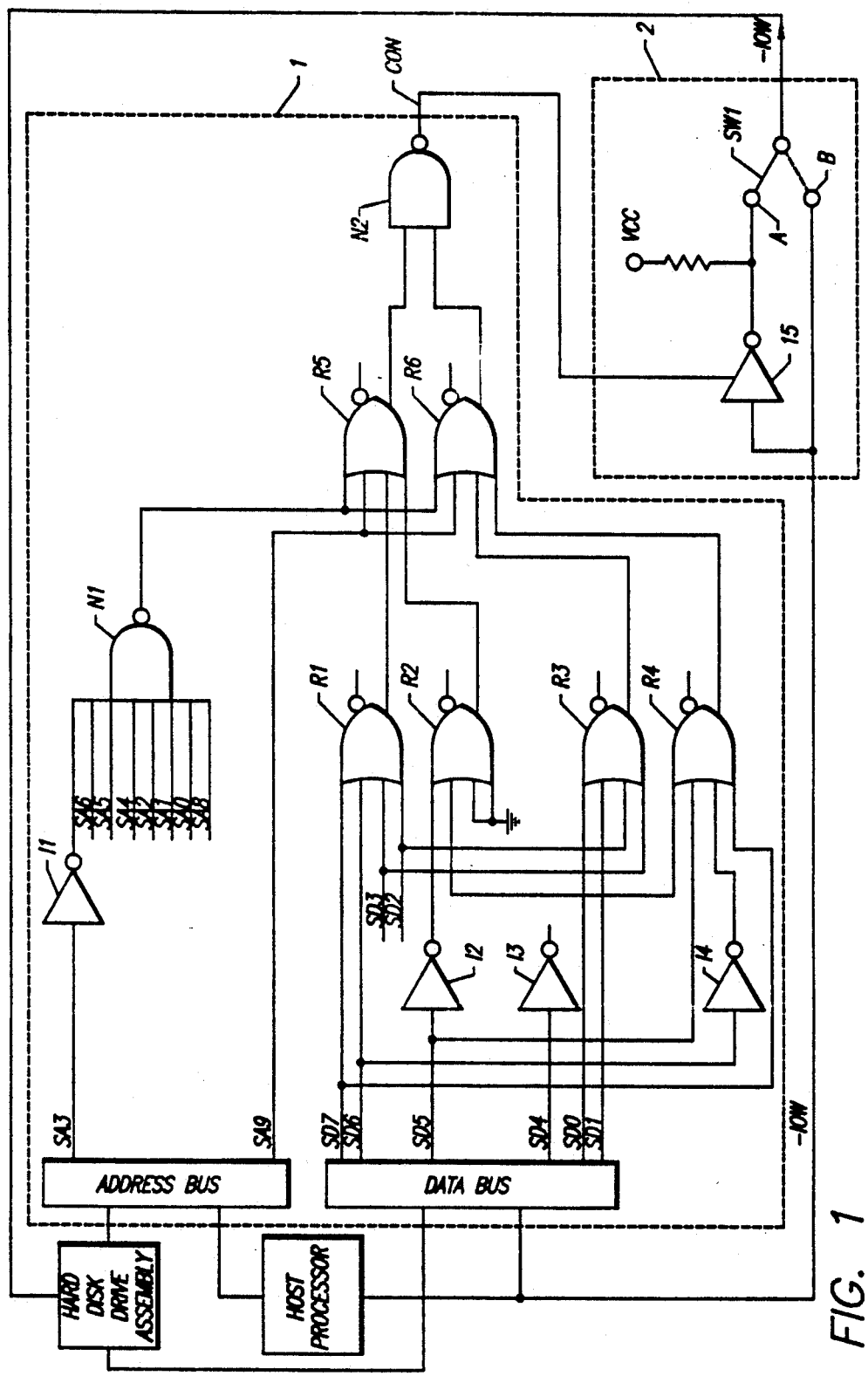
FIG. 1 is a circuit diagram showing the circuit comprised in the hard disk write protection device in accordance with the present invention.

Referring to the drawing, a hard disk write protection device in accordance with the present invention comprises a decoding circuit 1 and a disabling circuit 2. The inputs of the decoding circuit 1 are respectively connected to the address and data buses of a personal computer (not shown). In the drawing, symbols SA0–SA9 respectively represent signal lines of the address bus and symbols SD0–SD7 respectively represent signal lines of the data bus. By decoding signals forwarded to the decoding circuit 1 via the data bus and the address bus, the decoding circuit 1 generates a write protection control signal on an output terminal CON thereof. This write protection control signal is then sent to the disabling circuit 2 for actuating the disabling circuit 2 to disable the write function of the hard disk (not shown) of the personal computer.

The decoding circuit 1 comprises at least four invertors (I1, I2, I3 and I4), six OR gates (R1–R6) and two NAND gates (N1 and N2). All signal lines of the address bus are directly connected to NAND gate N1, except signal lines SA3 and SA9. SA3 is connected to an input of NAND gate N1 via invertor I1. With this arrangement, a hexadecimal signal on the address bus with a primary part of 1F7 and a secondary part of 177 which represents an I/O address of the hard disk can be decoded among other signals on the address bus.

As to the data bus signals, conventionally, hexadecimal signal 50 represents a FORMAT TRACK command and hexadecimal signals 30–33 represent WRITE SECTOR commands. In the embodiment shown in the drawing, invertor I2, I3 and I4 and OR gates R1–R4 are arranged in accordance with any known technique to decode the just-mentioned hexadecimal signals among other signals present on the data bus. Two of the OR gates, R3 and R4, and an invertor, I4, are used to decode the signals of hexadecimal 50 and transferring this signal to OR gate R6. The hexadecimal signals 30–33 are decoded by OR gates R1 and R2 and invertors I2 and I3 and the result thereof is sent to OR gate R5. Since such an arrangement is quite common to those skilled in the art, it is not necessary to provide a more detailed description.

The outputs of OR gates R5 and R6 are connected to the inputs of NAND gate N2 so that once the decoding circuit 1 encounters the above-mentioned hexadecimal signals, the write protection control signal is generated on the output terminal CON of NAND gate N2. This write protection control signal is used to control the actuation of the disabling circuit 2.

The disabling circuit 2 comprises a tri-state buffer I5 of which the inputs are respectively connected to the output CON of the decoding circuit and an I/O control signal line LOW. When the computer attempts to overwrites the hard disk, including writing to sectors of the hard disk and formatting tracks of the hard disk, a LOW signal is generated on the CON terminal and the tri-state buffer I5 cuts off the connection of the IOW line to the hard disk so as to disable the hard disk. If the computer takes other actions than over-writing the hard disk, then a HIGH signal is present on the CON terminal and the IOW line is connected to the hard disk via the tri-state buffer I5 to perform hard disk operations.

A switch SW1 is disposed to provide a direct connection of the IOW line the hard disk. If the switch is set to contact A which is in connection with the output of the tri-state buffer I5, the IOW line is connected to the hard disk via the tri-state buffer I5 and thus controlled by the tri-state buffer I5. If the switch is set to contact B which is a by-pass line of the IOW line, then the IOW line is directly connected to the hard disk and thus the hard disk operates and a conventional hard disk and the hard disk write protection device of the present invention is disabled.

It is apparent that although the invention has been described in connection with a preferred embodiment, those skilled in the art may make changes to certain features of the preferred embodiment without departing from the spirit and scope of the invention as defined in the appended claims.

What is claimed is:

1. A hard disk write protection circuit for use in a digital storage system which includes a hard disk drive assembly for storing digital data therein, at least one host processor, at least one address bus and data bus coupling said hard disk drive assembly and host processor, and an input/output control line coupled to said host processor for controlling data transfer command signals to said hard disk drive assembly, said write protection circuit comprising:
   a decoding circuit having an output and a plurality of inputs respectively connected to said address and data buses;
   said decoding circuit generating a write protection control signal at said output upon having decoded either a WRITE SECTOR command signal or a FORMAT TRACK command signal received from said data bus together with a hard disk input/output address command signal received from said address bus;
   a disabling circuit having an output and at least a first input connected to said decoding circuit output and a second input connected to said input/output control line:
   said disabling circuit suppressing a data transfer command signal transmitted on said input/output control line when said first input receives a write protection control signals from said decoding circuit; and
   switching means for selectably activating and deactivating said disabling circuit;
   said switching means coupling said disabling circuit output to said hard disk drive assembly when said disabling circuit is activated;
   whereby said hard disk drive assembly operates as a conventional hard disk drive assembly when said disabling circuit is deactivated.

2. A hard disk write protection circuit as defined in claim 1, wherein said FORMAT TRACK command signal is represented by hexadecimal instruction code 50, said WRITE SECTOR command signal is represented by any of hexadecimal instruction codes 30, 31, 32 and 33, and the input/output address command signal is combination of instruction codes comprising a primary part and a secondary part; said primary part represented by hexadecimal instruction code 1F7 and said secondary part represented by hexadecimal instruction code 177, said hexadecimal instruction code format conforming to a conventional scheme for representing computer instructions.

3. A hard disk write protection circuit as defined in claim 2, wherein said decoding circuit comprises at least one invertor and at least one NAND gate to decode said hexadecimal instruction code combination 1F7 and 177 received from said address bus, and said decoding circuit also comprises a plurality of invertors and OR gates to decode any of said hexadecimal instruction codes 50, 30, 31, 32 or 33 received from said data bus;
   whereby a HIGH signal represented by a positive potential relative to ground is generated at the output of said decoding circuit until said decoding circuit decodes hexadecimal instruction code combination 1F7 and 177 together with any of hexadecimal instruction codes 50, 30, 31, 32 or 33 received from said address and data buses respectively after which a LOW signal represented by relative ground is generated at the output of said decoding circuit.

4. A hard disk write protection circuit as defined in claim 1, wherein said disabling circuit comprises a tri-state buffer having an output and at least a first and second input;
   said first input being connected to said decoding circuit output and said second input being connected to said input/output control line;
   whereby a data transfer command signal on said input/output control line is suppressed when said first input receives a write protection signal from said decoding circuit, and a data transfer command signal on said input/output control line is not suppressed when no said write protection signal is received by said first input.

5. A hard disk write protection circuit as defined in claim 1, wherein said switching means includes a switch having an output connected to said hard disk drive assembly, a first switchable input connected to said input/output control line, and a second switchable input connected to the output of said disabling circuit;
   whereby said disabling circuit is activated when said second switchable input is selected, and said disabling circuit is deactivated when said first switchable input is selected.

6. A hard disk write protection circuit as defined in claim 1, wherein said decoding circuit is responsive to a plurality of over-write command signals received from said data bus.

7. A hard disk write protection circuit for use in a digital storage system which includes a hard disk drive assembly for storing digital data therein, at least one host processor, at least one address bus and data bus coupling said hard disk drive assembly and host processor, and an input/output control line coupled to said host processor for controlling data transfer command signals to said hard disk drive assembly, said write protection circuit comprising:
   a decoding circuit having an output and a plurality of inputs respectively connected to said address and data buses;
   said decoding circuit generating a write protection control signal at said output upon having decoded an over-write command signal received from said data bus together with a hard disk input/output address command signal received from said address bus; and a disabling circuit having an output coupled to said hard disk drive assembly and at least a first input connected to said decoding circuit output and a second input connected to said input/output control line;

said disabling circuit suppressing a data transfer command signal transmitted on said input/output control line when said first input receives a write protection control signal from said decoding circuit.

8. A hard disk write protection circuit as defined in claim 7, wherein said decoding circuit is responsive to a plurality of over-write command signals received from said data bus.

9. A hard disk write protection circuit as defined in claim 7, including a switch interposing said hard disk drive assembly and said disabling circuit output for selectably activating and deactivating said disabling circuit;

said switch having an output connected to said hard disk drive assembly, a first switchable input connected to said input/output control line, and a second switchable input connected to the output of said disabling circuit;

whereby said disabling circuit is activated when said second switchable input is selected, and said disabling circuit is deactivated when said first switchable input is selected thereby providing a coupling of said input/output control line to said hard disk drive assembly.

10. A hard disk write protection circuit as defined in claim 7, wherein said decoding circuit generates a write protection signal at said output upon having decoded either a FORMAT TRACK or WRITE SECTOR command signal received from said data bus together with a hard disk input/output address command signal received from said address bus.

11. A hard disk write protection circuit as defined in claim 10, wherein said FORMAT TRACK command signal is represented by hexadecimal instruction code 50, said WRITE SECTOR command signal is represented by any of hexadecimal instruction codes 30, 31, 32 or 33, and the input/output address command signal is a combination of instruction codes comprising a primary part and a secondary part;

said primary part represented by hexadecimal instruction code 1F7 and said secondary part represented by hexadecimal instruction code 177, said hexadecimal instruction code format conforming to a conventional scheme for representing computer instructions.

12. A hard disk write protection circuit as defined in claim 11, wherein said decoding circuit comprises at least one invertor and at least one NAND gate to decode said hexadecimal instruction code combination 1F7 and 177 received from said address bus, and said decoding circuit also comprises a plurality of invertors and OR gates to decode any of said hexadecimal instruction codes 50, 30, 31, 32 and 33 received from said data bus;

whereby a HIGH signal represented by a positive potential relative to ground is generated at the output of said decoding circuit until said decoding circuit decodes hexadecimal instruction code combination 1F7 and 177 together with any of hexadecimal instruction codes 50, 30, 31, 32 or 33 received from said address and data buses respectively after which a LOW signal represented by relative ground is generated at the output of said decoding circuit.

13. A hard disk write protection circuit for use in a digital storage system which includes a hard disk drive assembly for storing digital data therein, at least one host processor, at least one address bus and data bus coupling said hard disk drive assembly and host processor, and an input/output control line coupled to said host processor for controlling data transfer command signals to said hard disk drive assembly, said write protection circuit comprising:

means for decoding an over-write command signal received from said data bus, said over-write command signal instructing the transfer of data to said hard disk drive assembly;

means for generating a write protection control signal after said decoding means decodes said over-write command signal; and means for disabling data transfer command signals on said input/output control line after said disabling means receives a write protection control signal from said generating means, thereby preventing the transfer of data to said hard disk drive assembly.

14. A hard disk write protection circuit as defined in claim 13, including switching means for selectably activating and deactivating said disabling means, whereby said hard disk drive assembly operates as a conventional hard disk drive assembly when said disabling means is deactivated.

15. A hard disk write protection circuit as defined in claim 13, wherein said decoding circuit is responsive to a plurality of over-write command signals received from said data bus.

* * * * *